United States Patent
Hu et al.

(10) Patent No.: US 9,405,177 B2
(45) Date of Patent: Aug. 2, 2016

(54) COLOR WHEEL MODULE AND PROJECTION APPARATUS

(71) Applicants: Tung-Chou Hu, Hsin-Chu (TW); Hsin-Hui Lien, Hsin-Chu (TW); Sheng-Yu Chiu, Hsin-Chu (TW)

(72) Inventors: Tung-Chou Hu, Hsin-Chu (TW); Hsin-Hui Lien, Hsin-Chu (TW); Sheng-Yu Chiu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 57 days.

(21) Appl. No.: 14/334,671

(22) Filed: Jul. 18, 2014

(65) Prior Publication Data
US 2015/0085260 A1 Mar. 26, 2015

(30) Foreign Application Priority Data
Sep. 26, 2013 (CN) .......................... 2013 1 0444675

(51) Int. Cl.
*G03B 21/16* (2006.01)
*G02B 26/00* (2006.01)

(52) U.S. Cl.
CPC .............. *G03B 21/16* (2013.01); *G02B 26/008* (2013.01); *H04N 2209/043* (2013.01)

(58) Field of Classification Search
CPC . G02B 26/008; G03B 21/16; H04N 2209/043
See application file for complete search history.

(56) References Cited

U.S. PATENT DOCUMENTS

| 5,967,636 A * | 10/1999 | Stark ................... H04N 9/3129 348/743 |
| 6,755,554 B2 | 6/2004 | Ohmae et al. |
| 7,140,734 B2 | 11/2006 | Lim |
| 2007/0139519 A1* | 6/2007 | DeCusatis .............. G02B 27/26 348/58 |
| 2012/0013854 A1* | 1/2012 | Nishimura ............. G03B 21/16 353/57 |
| 2012/0327316 A1* | 12/2012 | Okada ................... G03B 21/16 348/748 |

FOREIGN PATENT DOCUMENTS

| CN | 1591165 | 3/2005 |
| CN | 1696819 | 11/2005 |
| CN | 201562114 | 8/2010 |
| JP | 2001100315 | 4/2001 |

OTHER PUBLICATIONS

Office Action of China Counterpart Application, issued on Apr. 25, 2016, p. 1-p. 11.

* cited by examiner

*Primary Examiner* — Sultan Chowdhury
*Assistant Examiner* — Magda Cruz
(74) *Attorney, Agent, or Firm* — Jianq Chyun IP Office

(57) ABSTRACT

A color wheel module and a projection apparatus are provided, wherein the color wheel module includes a color wheel, a cover and a flow detour duct. The cover shades the color wheel. The flow detour duct is communicated with the cover and has an airflow inlet and an airflow outlet. The rotating color wheel is configured to drive airflow into the flow detour duct from the airflow inlet, and cause the airflow through the color wheel and then discharged from the airflow outlet.

14 Claims, 11 Drawing Sheets

COLOR WHEEL MODULE AND PROJECTION APPARATUS

CROSS-REFERENCE TO RELATED APPLICATION

This application claims the priority benefit of China application serial no. 201310444675.0, filed on Sep. 26, 2013. The entirety of the above-mentioned patent application is hereby incorporated by reference herein and made a part of this specification.

BACKGROUND OF THE INVENTION

1. Field of the Invention

The invention generally relates to a light filter element and a projection apparatus, and more particularly, to a color wheel module and a projection apparatus adopting the color wheel module.

2. Description of Related Art

Digital light processing (DLP) projection apparatus is configured to filter an illumination beam emitted by a light source into three lights in red color, green color and blue color (R, G and B) through a high-speed rotary color wheel, and then the three lights are transmitted to a light valve to be converted into an imaging beam. The imaging beam is projected through a projection lens onto a screen to form frames. By continuously altering the angle of a micro mirror on the light valve in association with the high-speed rotary color wheel and taking advantage of the effect of the persistence of vision, a pixel can give out different color variations.

In general, a color wheel includes different dichroic filters and a rotating part (for example, a motor's rotor). In addition, in order to cause the on/off state of each micro mirror on the light valve matched to the rotation of the color wheel, an index mark is disposed on the rotating part of a color wheel module and the position of the index mark is sensed by a light sensor to obtain the position of the color wheel or a filter region of the color wheel through which the illumination beam passes so as to project out an image with desired color.

If the color wheel and the light sensor are in an open environment, however, it is likely caused that dust is very easily deposited on the color wheel and the light sensor so as to decrease the brightness of the illumination beam too fast and affect the normal operation of the projection apparatus. In addition, if temperature of the color wheel is too high, it may cause the motor to be overheated or the adhesive between the components of the color wheel to be melted, which causes the projection apparatus fail to be normally operated as well.

U.S. Pat. No. 6,755,554 discloses a color wheel unit, wherein a color wheel is fixed at a body of the color wheel unit and covered by a cover of the color wheel unit. China Utility Patent No. 201562114U discloses a projector comprising a light source device, a color wheel and a first heat-dissipating model.

SUMMARY OF THE INVENTION

Accordingly, the invention is directed to a color wheel module with good reliability.

The invention is also directed to a projection apparatus with good reliability.

Other objectives, features and advantages of the invention will be further understood from the further technical features disclosed by the embodiments of the invention.

To achieve one of, a part of or all of the above-mentioned objectives, or to achieve other objectives, an embodiment of the invention provides a color wheel module which includes a color wheel, a cover and a flow detour duct. The cover shades the color wheel. The flow detour duct is communicated with the cover and has an airflow inlet and an airflow outlet. The color wheel is configured to drive airflow so that the airflow enters the flow detour duct from the airflow inlet, then flows through the color wheel and is discharged from the airflow outlet.

An embodiment of the invention provides a projection apparatus which includes a light source, an above-mentioned color wheel module, a light valve and a projection lens. The light source is configured to emit an illumination beam. The color wheel of the color wheel module is disposed on the transmission path of the illumination beam. The light valve is disposed on the transmission path of the illumination beam to convert the illumination beam into an imaging beam. The projection lens is disposed on the transmission path of the imaging beam to project the imaging beam.

Based on the depiction above, the embodiments of the invention can achieve at least one of the following advantages or effects. In the embodiments of the invention, the rotating color wheel drives the airflow to cause the airflow meanders in the flow detour duct. As a result, the dust does not pass through easily, and the possibility of the dust attaching on the color wheel is decreased to realize the dustproof effect. In addition, the embodiments of the invention can also achieve the heat-dissipating effect through the flowing of the airflow and further have good reliability.

BRIEF DESCRIPTION OF THE DRAWINGS

In order to make the features and advantages of the invention more comprehensible, the invention is further described in detail in the following with reference to the embodiments and the accompanying drawings.

DESCRIPTION OF THE EMBODIMENTS

The above-mentioned or other relevant technical principles and the features and effects thereof are clearly presented together with the accompanying drawings in the following depicted embodiments. Note that some of expression words hereinafter regarding direction or orientation, such as 'up', 'down', 'left', 'right', 'front', 'behind', and the like, are to describe, not to limit, the invention.

Figure 1:
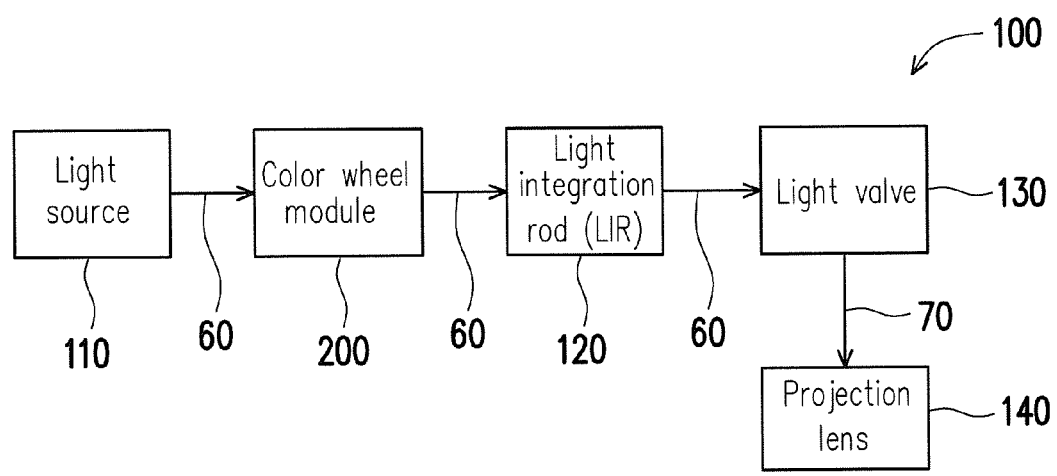
FIG. 1 is a block diagram of a projection apparatus according to an embodiment of the invention.

FIG. 1 is a block diagram of a projection apparatus according to an embodiment of the invention. Referring to FIG. 1, a projection apparatus 100 of the embodiment includes a light source 110, a color wheel module 200, a light integration rod (LIR) 120, a light valve 130 and a projection lens 140. Specifically, as shown by FIG. 1, in the embodiment, the light source 110 is configured to emit an illumination beam 60, and the color wheel module 200 and the LIR 120 are disposed on the transmission path of the illumination beam 60 in sequence. The light valve 130 is disposed on the transmission path of the illumination beam 60 as well so as to convert the illumination beam 60 into an imaging beam 70. The projection lens 140 is disposed on the transmission path of the imaging beam 70 so as to project the imaging beam 70.

In more details, the color wheel module 200 sequentially converts the white illumination beam 60 emitted by the light source 110 into a plurality of illumination beams 60 with different colors (for example, R, G and B), while the LIR 120 is capable of uniformizing the illumination beams 60 with different colors. Then the illumination beams 60 are converged on the light valve 130 through the other optical elements (not shown) in the projection apparatus 100. Then, the light valve 130 may sequentially converts the illumination beams 60 with different colors into the imaging beams 70 with different colors and the projection lens 140 projects the imaging beams 70 with different colors so as to produce frames with different colors on a screen. Therefore, a colorful frame is perceptible for the viewer by the effect of the persistence of vision.

Figure 2A:
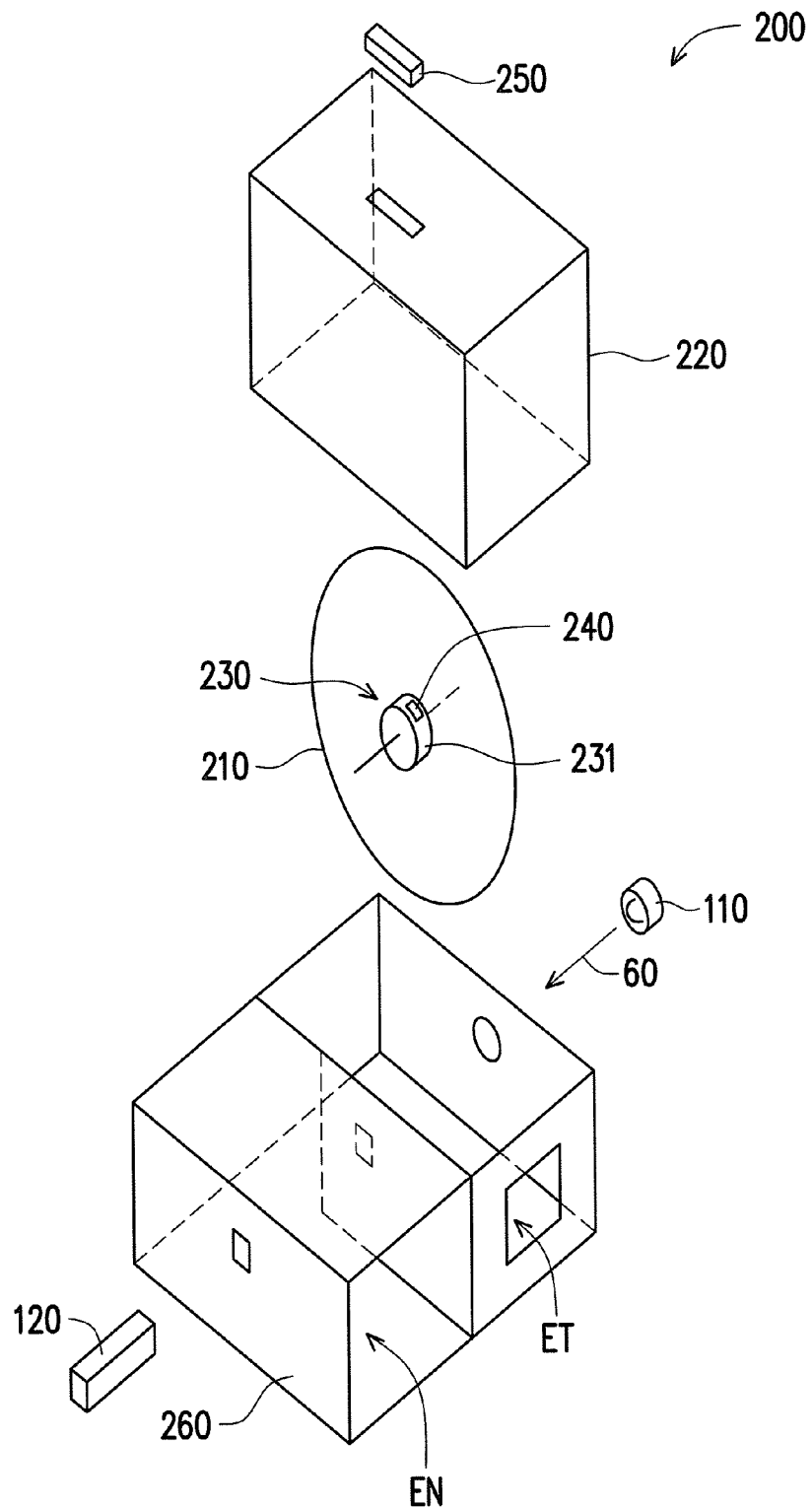
FIG. 2A is a schematic exploded diagram of the color wheel module of FIG. 1.
Figure 2B:
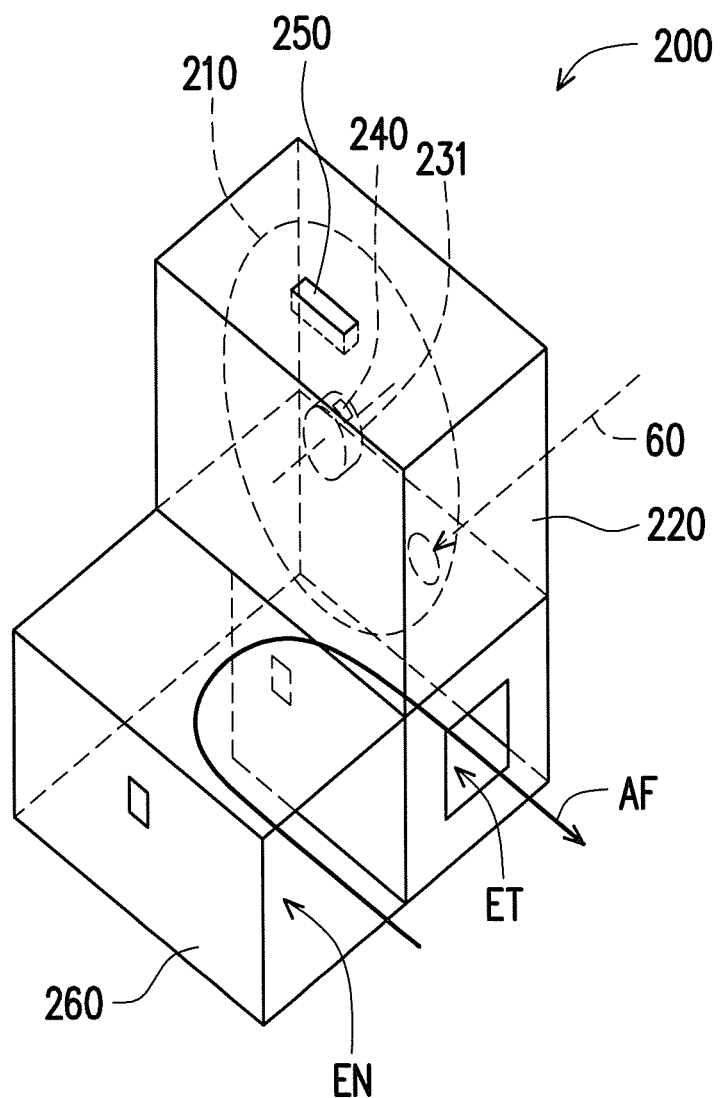
FIG. 2B is a perspective view diagram of the color wheel module of FIG. 2A.
Figure 2C:
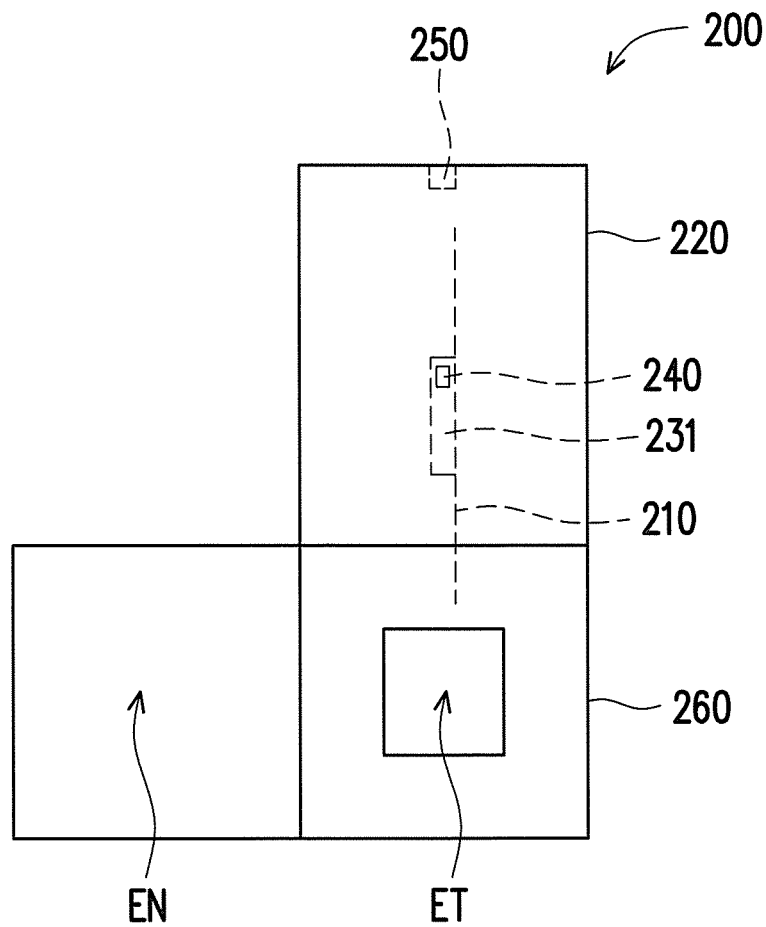
FIG. 2C is a front-view diagram of the color wheel module of FIG. 2A.

FIG. 2A is a schematic exploded diagram of the color wheel module of FIG. 1, FIG. 2B is a perspective view diagram of the color wheel module of FIG. 2A and FIG. 2C is a front-view diagram of the color wheel module of FIG. 2A. Referring to FIGS. 2A and 2B, in the embodiment, the color wheel module 200 includes a color wheel 210, a cover 220, a motor 230, an index mark 240, a light sensor 250 and a flow detour duct 260. The color wheel 210 is disposed on the transmission path of the illumination beam 60 and the cover 220 shades the color wheel 210. In the embodiment, the cover 220 can be made of plastic or metal. In the embodiment, the cover 220 forms a semi-enclosed space to avoid the light leakage, so that no additional light-shading structure is required to be disposed and thus the product cost is reduced.

In the embodiment, the motor 230 has a rotor 231 connected to the color wheel 210, wherein the index mark 240 is disposed on the rotor 231. The light sensor 250 is disposed on the cover 220 and able to sense the position of the index mark 240 to obtain the rotating position of the color wheel 210 so as to convert into the illumination beam 60 with desired color. In the embodiment, the light sensor 250 is located at a top of the cover 220, wherein the light sensor 250 is relatively far away from the transmission path of the illumination beam 60 so as to avoid sensing the scattered stray light from the illumination beam 60 via other regions. For example, the color wheel 210 is disposed between the light sensor 250 and the flow detour duct 260.

Referring to FIGS. 2B and 2C, in the embodiment, the flow detour duct 260 is communicated with the cover 220, and the flow detour duct 260 has an airflow inlet EN and an airflow outlet ET. In more details, when the projection apparatus 100 is working, the hot air produced by the rotation of the color wheel 210 would be discharged from the airflow outlet ET so as to drive a cold airflow AF entering the flow detour duct 260 from the airflow inlet EN, flowing through the color wheel 210 and being discharged from the airflow outlet ET. In the followings, the structure, the mechanism and the effect of the flow detour duct 260 are further expressed accompanying with FIGS. 2D-2E.

Figure 2D:
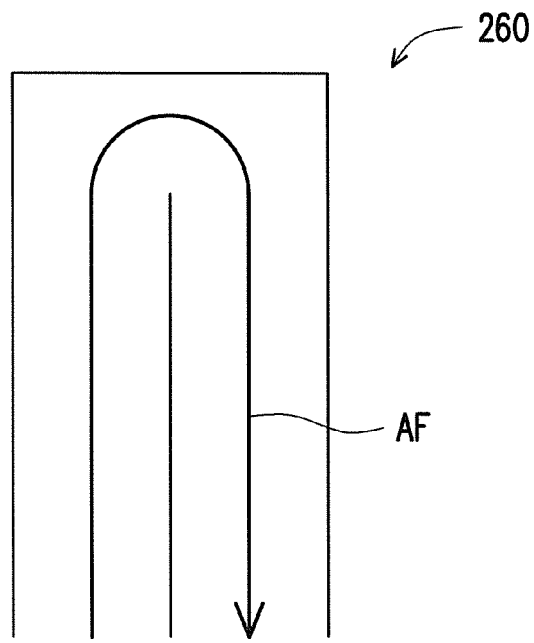
FIG. 2D is a schematic structure diagram of the flow detour duct in FIG. 2A.
Figure 2E:
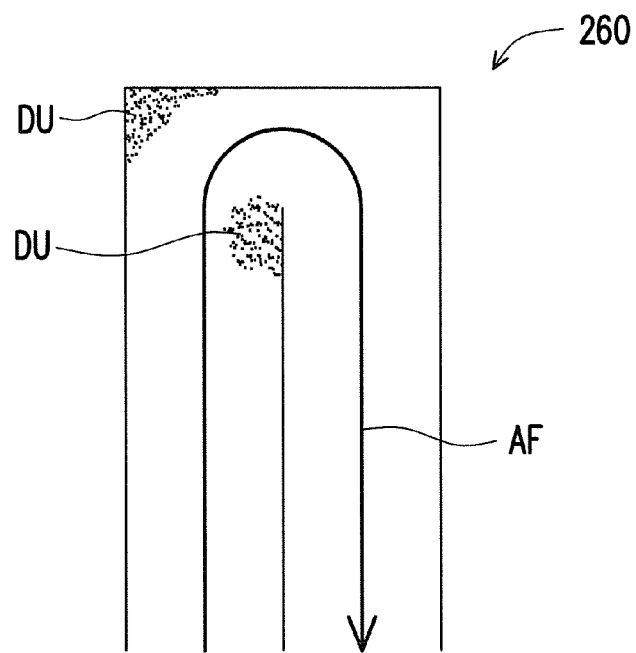
FIG. 2E is a diagram showing the dust deposited on the flow detour duct in FIG. 2A.

FIG. 2D is a schematic structure diagram of the flow detour duct in FIG. 2A and FIG. 2E is a diagram showing the dust deposited on the flow detour duct in FIG. 2A. Referring to FIG. 2D, in the embodiment, a flow passage in the flow detour duct 260 has at least one inflection portion (not numbered). When the airflow AF enters the flow detour duct 260 from the airflow inlet EN, the flowing direction of the airflow AF is changed through the inflection portion, then the airflow AF is discharged from the airflow outlet ET. In other words, the airflow AF meanders in the flow detour duct 260. In addition, when the airflow AF passes through the inflection portion, the velocity of the airflow AF gets affected to be changed, so that the airflow's directions and velocities are inconsistent around the flow detour duct 260. Therefore, when the airflow AF does not arrive at the color wheel 210 yet, the dust DU carried by the airflow AF would fall down at the place where the flowing velocity is lower or be deposited at the inflection portion (as shown by FIG. 2E). As a result, the possibility for the dust DU to be attached on the color wheel 210 is reduced so as to achieve a dustproof effect and further maintain the system luminance.

On the other hand, the flowing airflow AF in the flow detour duct 260 can advance the heat-dissipating effects of the color wheel module 200 and the projection apparatus 100 as well. For example, when the airflow AF driven by the rotating color wheel 210 enters the flow detour duct 260 from the airflow inlet EN, the airflow AF is mixed with the hot air produced by running of the motor 230 or rotor 231 of the color wheel 210, and then is discharged from the airflow outlet ET. In this way, it can effectively lower down the system temperatures of the color wheel module 200 and the projection apparatus 100 to obtain the heat-dissipating effect and obtain good reliability.

It should be noted that although the shape of the flow detour duct 260 herein is U-shape as an example, however, the invention is not limited to. In other embodiments, there are other different structural designs configure for the shape of the flow detour duct according to actual requirements. Moreover, the positions of the airflow inlet EN and the airflow outlet ET can be determined according to the direction of the actual flowing-field system, referring to FIGS. 3A and 3B in follows.

Figure 3A:
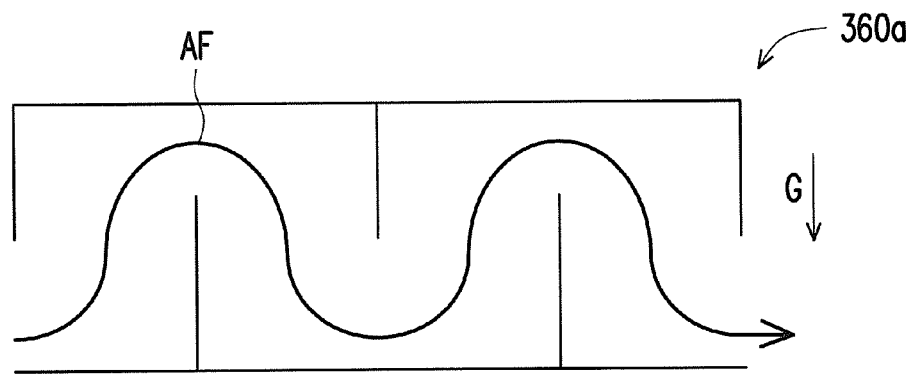
FIG. 3A is a schematic structure diagram of a flow detour duct according to another embodiment of the invention.

FIG. 3A is a schematic structure diagram of a flow detour duct according to another embodiment of the invention. The flow detour duct 360a of the embodiment is similar to the flow detour duct 260 in FIG. 2D, among which the difference will be described as follows. As shown in FIG. 3A, the flow detour duct 360a in the embodiment has a plurality of inflection portions. In addition, the flow detour duct 360a meanders on a plane parallel to the gravity direction G. In other words, the flow detour duct 360a meanders on a vertical plane. Since the plural inflection portions of the flow detour duct 360a can also change the flowing direction of the airflow AF and cause the airflow AF being discharged from the airflow outlet ET after flowing through the color wheel 210. Thus, the flow detour duct 360a in the embodiment can achieve the same effect and advantages as described with respect to the flow detour duct 260, which will not be repeatedly described hereinafter.

Figure 3B:
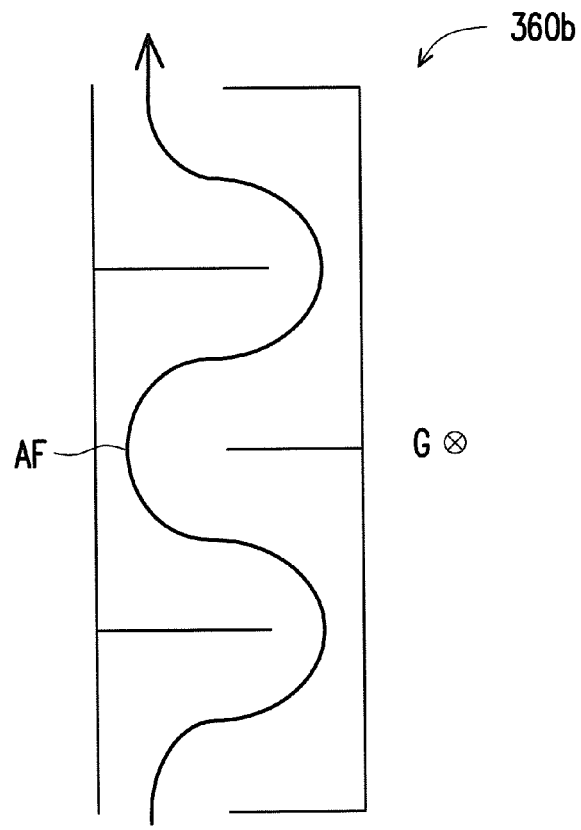
FIG. 3B is a schematic structure diagram of a flow detour duct according to yet another embodiment of the invention.

FIG. 3B is a schematic structure diagram of a flow detour duct according to yet another embodiment of the invention. The flow detour duct 360b of the embodiment is similar to the flow detour duct 360a in FIG. 3A, among which the difference will be described as follows. As shown in FIG. 3B, the flow detour duct 360b in the embodiment meanders on a plane perpendicular to the gravity direction G. In other words, the flow detour duct 360a meanders on a horizontal plane. Since the plural inflection portions of the flow detour duct 360b can also change the flowing direction of the airflow AF and cause the airflow AF being discharged from the airflow outlet ET after flowing through the color wheel 210. Thus, the flow detour duct 360b in the embodiment can achieve the same effect and advantages as described with respect to the flow detour duct 360a, which will not be repeatedly described hereinafter.

Figure 4:
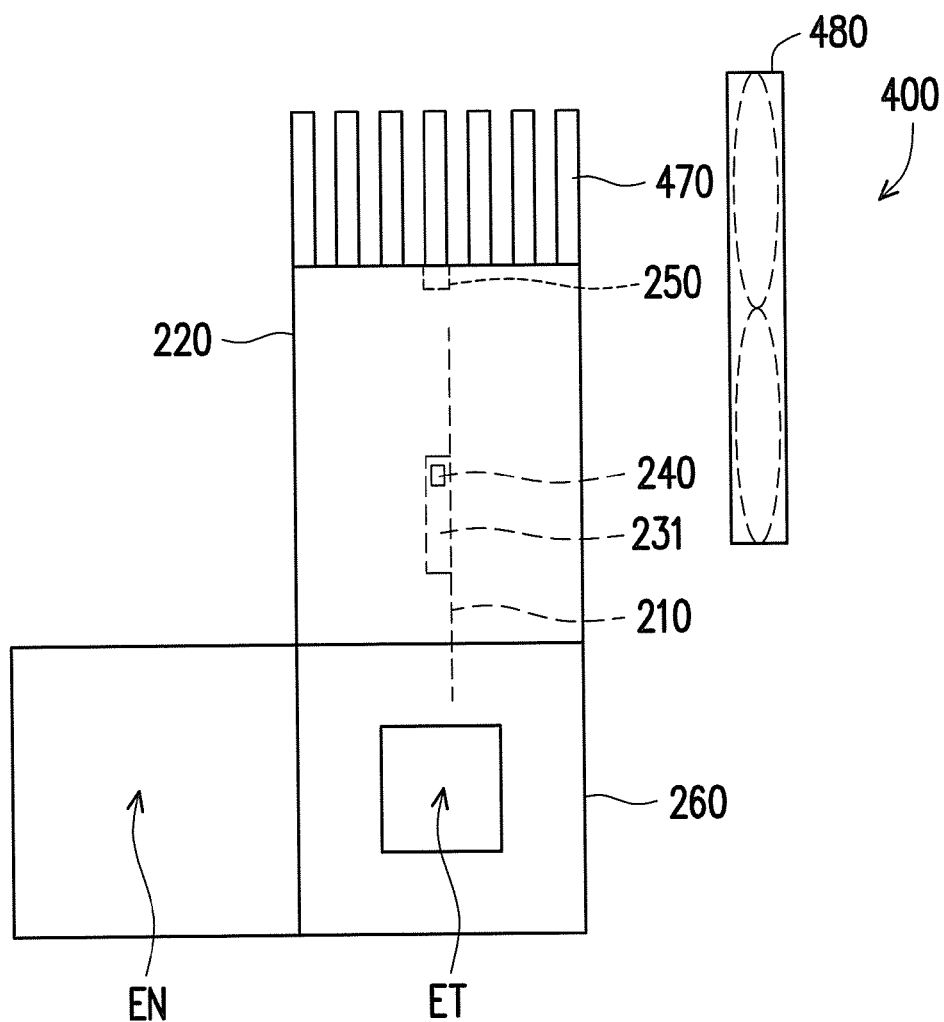
FIG. 4 is a front-view diagram of a color wheel module according to another embodiment of the invention.

FIG. 4 is a front-view diagram of a color wheel module according to another embodiment of the invention. The color wheel module 400 of the embodiment is similar to the color wheel module 200 in FIG. 2C, among which the difference will be described as follows. As shown in FIG. 4, the color wheel module 400 in the embodiment further includes a plurality of heat-dissipating fins 470 and a fan 480. Specifically, the heat-dissipating fins 470 in the embodiment is thermal conductively connected to the cover 220 and the flow detour duct 260 so as to increase the heat-exchanging rate of the cover 220 to improve the heat-dissipating effect. On the other hand, the fan 480 is disposed beside the heat-dissipating fins 470 to produce an airflow flowing through the heat-dissipating fins 470, so as to cool the heat-dissipating fins 470, and further reduce the temperatures of the color wheel 210, the motor 230 and the light sensor 250 in the cover 220. Therefore, the heat-dissipating effect of the color wheel module 400 could be further improved. In addition, since the color wheel module 400 of the embodiment is similar to the color wheel module 200 of FIG. 2C in terms of the structure, so that the color wheel module 400 in the embodiment can achieve the same effect and advantages of the color wheel module 200, which will not be repeatedly described hereinafter.

Figure 5A:
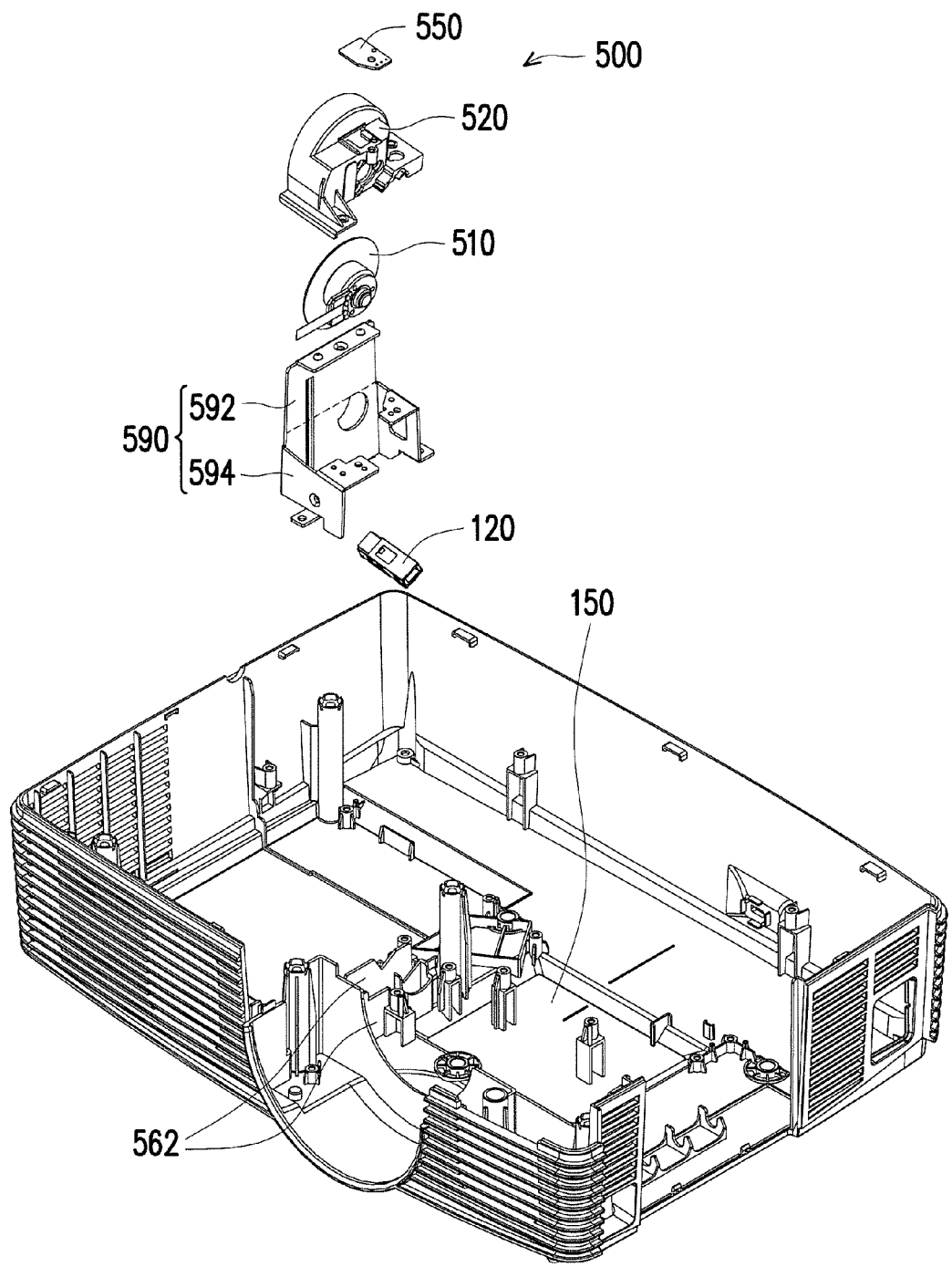
FIG. 5A is a schematic exploded diagram of a color wheel module used in a projection apparatus and disposed at the base of the projection apparatus in an angle of view according to an embodiment of the invention.
Figure 5B:
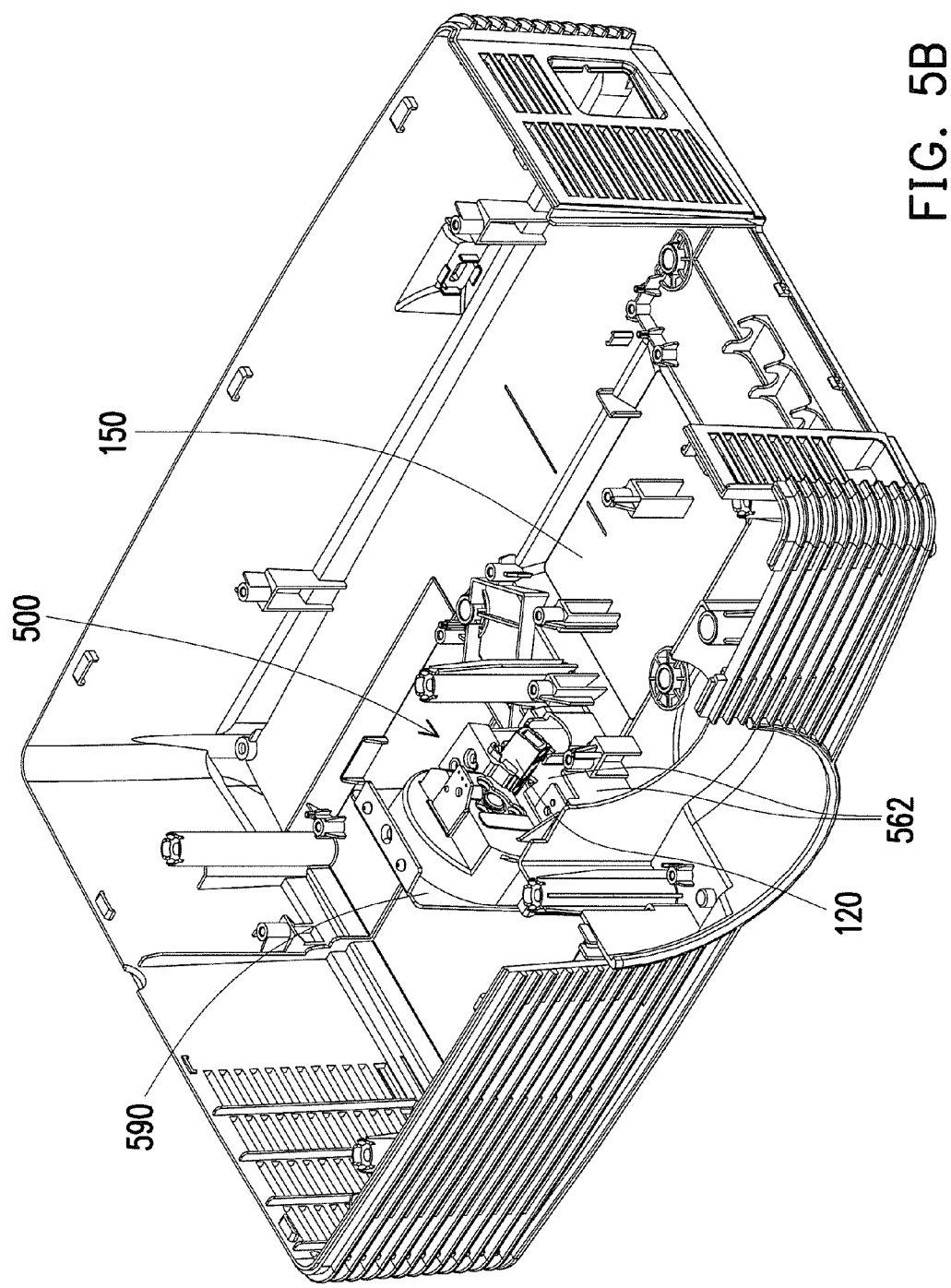
FIG. 5B is a perspective view diagram of the color wheel module of FIG. 5A assembled at the base of the projection apparatus.
Figure 5C:
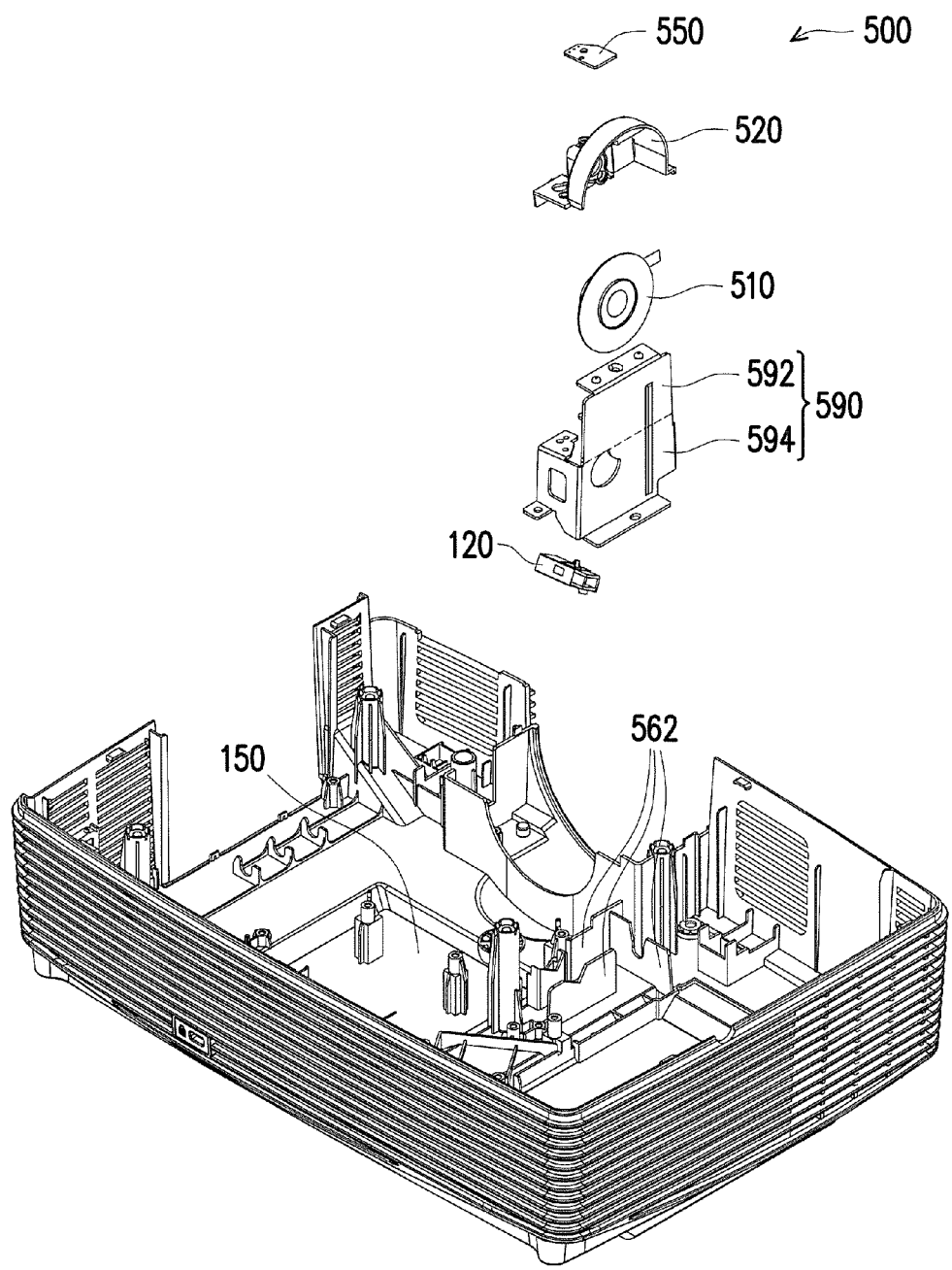
FIG. 5C is a schematic exploded diagram of the color wheel module and the base of the projection apparatus of FIG. 5A in another angle of view.
Figure 5D:
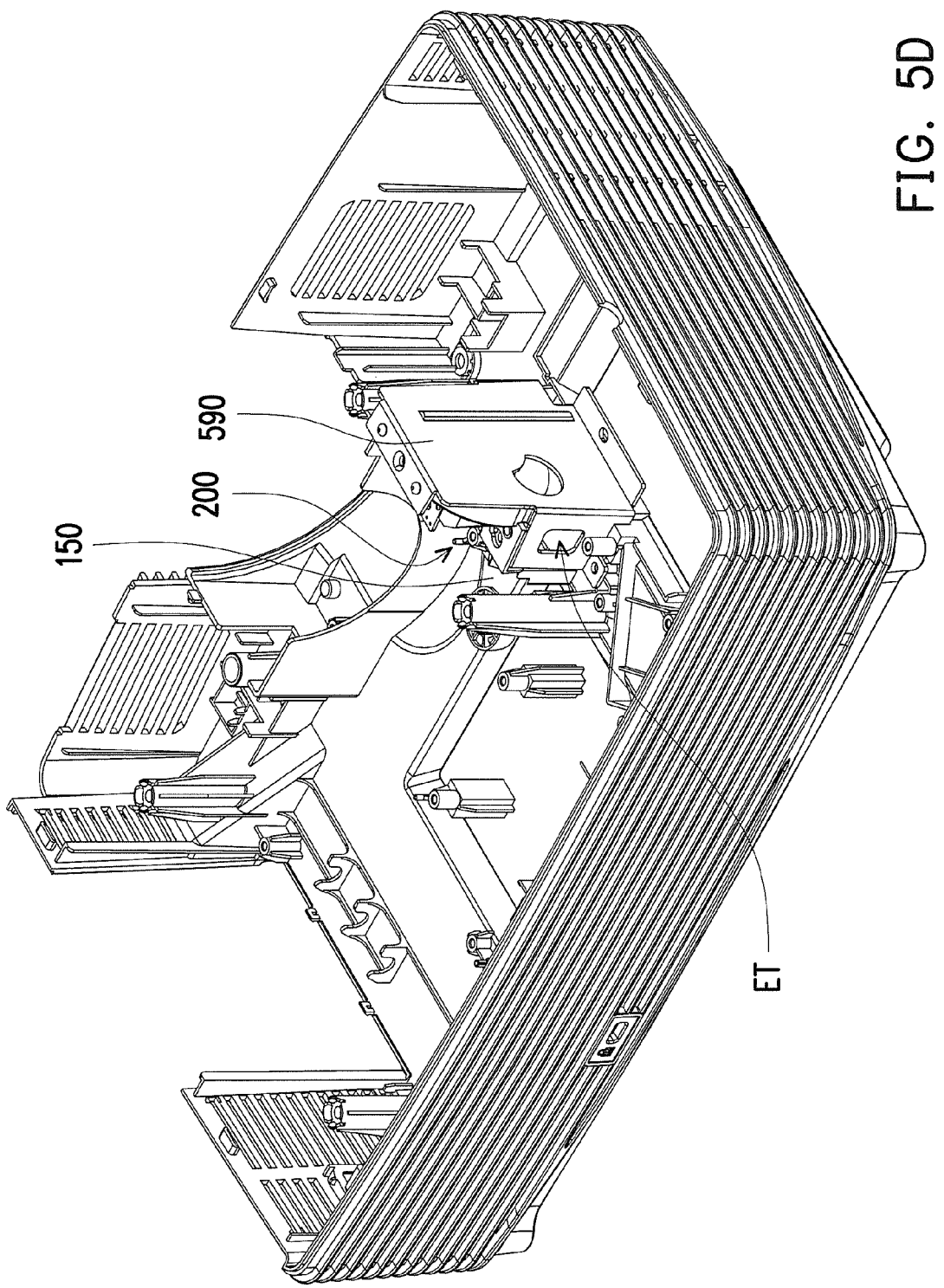
FIG. 5D is a perspective view diagram of the color wheel module and the base of the projection apparatus of FIG. 5B in another angle of view.

FIG. 5A is a schematic exploded diagram of a color wheel module used in a projection apparatus and disposed at the base of the projection apparatus in an angle of view according to an embodiment of the invention, FIG. 5B is a respective view of the color wheel module of FIG. 5A assembled at the base of the projection apparatus, FIG. 5C is a schematic exploded diagram of the color wheel module and the base of the projection apparatus of FIG. 5A in another angle of view and FIG. 5D is a respective view of the color wheel module and the base of the projection apparatus of FIG. 5B in another angle of view. The color wheel module 500 of the embodiment is similar to the color wheel module 200 in FIG. 2A, among which the difference will be described as follows. Referring to FIGS. 5A and 5B, the color wheel module 500 in the embodiment includes a cover 520 and a fixing member 590, wherein the cover 520 and an upper portion 592 of the fixing member 590 form a structure similar to the cover 220 of FIG. 2A to shade the color wheel 510, and a lower portion 594 of the fixing member 590, a plurality of partitions 562 and part of the base 150 of the projection apparatus form a flow detour duct 260 shown in FIG. 2B to cause the airflow flow therein. In addition, in the embodiment, a light sensor 550 is disposed on the cover 520 to sense the rotating position of the color wheel 510, wherein the color wheel 510 is disposed between the light sensor 550 and the base 150.

On the other hand, further referring to FIGS. FIGS. 5C and 5D, in the embodiment, the color wheel 510 can be assembled to the base 150 of the projection apparatus 100 through the fixing member 590. After the airflow flows through the color wheel 510, the airflow can be discharged from the airflow outlet ET (as shown by FIG. 5D) to obtain the above-mentioned dustproof and heat-dissipating effects. In the embodiment, the partitions 562 and the base 150 can be integrated formed, i.e., the partitions 562 and the base 150 can be fabricated in moulding method to reduce the cost of the moulds.

In summary, in the embodiments of the invention, the rotating color wheel drives the airflow to cause the airflow meanders in the flow detour duct, so that the dusts does not pass through easily, and the possibility of the dusts attaching on the color wheel is decreased to realize the dustproof effect. In addition, the embodiments of the invention can also achieve the heat-dissipating effect through the flowing of the airflow and further have good reliability. The semi-enclosed space formed by the cover in the embodiments of the invention can avoid light leakage so that no additional shading structure is required, and therefore, the product cost is reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims.

What is claimed is:

1. A color wheel module, comprising:
   a color wheel;
   a cover, shading the color wheel; and
   a flow detour duct, communicated with the cover and having an airflow inlet and an airflow outlet, wherein the color wheel is configured to drive an airflow, and the airflow enters the flow detour duct from the airflow inlet, then flows through the color wheel and is discharged from the airflow outlet, wherein the flow detour duct has at least two air flow channels, the at least two air flow channels are communicated with at least one inflection portion, and an inflection angle of the at least one inflection portion is greater than or equal to 90 degrees.

2. The color wheel module as claimed in claim 1, wherein the flow detour duct meanders on a plane parallel to the gravity direction.

3. The color wheel module as claimed in claim 1, wherein the flow detour duct meanders on a plane perpendicular to the gravity direction.

4. The color wheel module as claimed in claim 1, further comprising:
   a plurality of heat-dissipating fins, thermal conductively connected to the cover.

5. The color wheel module as claimed in claim 1, further comprising:

a fan, disposed beside the heat-dissipating fins to produce a cooling airflow flowing through the heat-dissipating fins.

6. The color wheel module as claimed in claim 1, further comprising:
a motor, having a rotor, wherein the rotor is connected to the color wheel;
an index mark, disposed on the rotor; and
a light sensor, disposed on the cover and sensing a position of the index mark to obtain a rotating position of the color wheel.

7. A projection apparatus, comprising:
a light source, configured to emit an illumination beam;
a color wheel module, comprising:
  a color wheel, disposed on the transmission path of the illumination beam;
  a cover, shading the color wheel; and
  a flow detour duct, communicated with the cover and has an airflow inlet and an airflow outlet, wherein the color wheel is configured to drive an airflow, and the airflow enters the flow detour duct from the airflow inlet, then flows through the color wheel and is discharged from the airflow outlet, wherein the flow detour duct has at least two air flow channels, the at least two air flow channels are communicated with at least one inflection portion, and an inflection angle of the at least one inflection portion is greater than or equal to 90 degrees;
a light valve, disposed on the transmission path of the illumination beam to convert the illumination beam into an imaging beam; and
a projection lens, disposed on the transmission path of the imaging beam to project the imaging beam.

8. The projection apparatus as claimed in claim 7, wherein the flow detour duct meanders on a plane parallel to the gravity direction.

9. The projection apparatus as claimed in claim 7, wherein the flow detour duct meanders on a plane perpendicular to the gravity direction.

10. The projection apparatus as claimed in claim 7, wherein the color wheel module further comprises:
a plurality of heat-dissipating fins, thermal conductively connected to the cover.

11. The projection apparatus as claimed in claim 7, wherein the color wheel module further comprises:
a fan, disposed beside the heat-dissipating fins to produce a cooling airflow flowing through the heat-dissipating fins.

12. The projection apparatus as claimed in claim 7, further comprising:
a light integration rod, disposed on the transmission path of the illumination beam.

13. The projection apparatus as claimed in claim 7, wherein the color wheel module further comprises:
a motor, having a rotor, wherein the rotor is connected to the color wheel;
an index mark, disposed on the rotor; and
a light sensor, disposed on the cover and sensing a position of the index mark to obtain a rotating position of the color wheel.

14. The projection apparatus as claimed in claim 13, wherein the light sensor is located at a place of the cover where is relatively far away from the transmission path of the illumination beam.

\* \* \* \* \*